United States Patent [19]

Kollman

[11] 4,396,166
[45] Aug. 2, 1983

[54] APPARATUS FOR USE IN TRANSPORTING ROLLS OF CARPET OR THE LIKE

[76] Inventor: Calvin Kollman, Box 1752, Columbus, Tex. 78934

[21] Appl. No.: 278,643

[22] Filed: Jun. 29, 1981

[51] Int. Cl.³ .............................................. B60P 1/00
[52] U.S. Cl. .............................. 242/86.52; 242/58.6; 414/559; 414/911
[58] Field of Search ................ 414/494, 506, 538–542, 414/559, 911; 242/58.6, 86.5 R, 86.52, 68

[56] References Cited

U.S. PATENT DOCUMENTS 3,750,811  8/1973  Anderson et al. ............. 414/559 X
3,971,484  7/1976  Anderson ....................... 414/538 X Primary Examiner—Robert G. Sheridan
Attorney, Agent, or Firm—Vaden, Eickenroht, Thompson, Bednar & Jamison

[57] ABSTRACT

An apparatus for transporting a roll of carpet or the like wherein the roll is adapted to be supported above the floor of a vehicle by a spindle extending through the roll and having its ends received in a bracket suspended from the ceiling of the vehicle. The roll is lifted onto the vehicle floor through a rear opening in the vehicle, and is raised into and lowered from supported position, by lines adapted to connect with the ends of the spindle. The end of the roll may be pulled through a side opening in the vehicle, and a closure for the opening may be arranged in a position adjacent the opening to provide a work surface for the end of the carpet.

9 Claims, 6 Drawing Figures

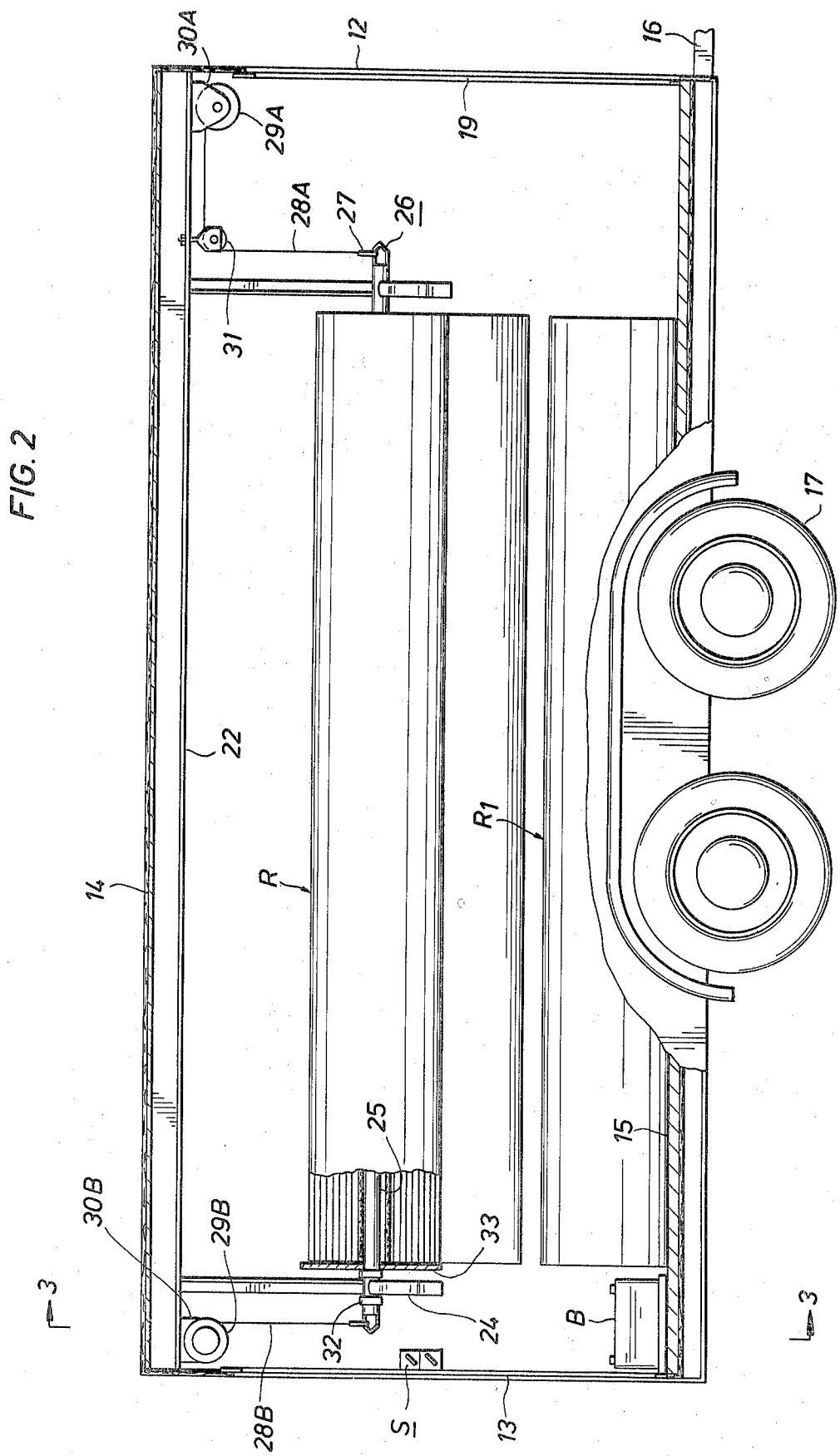

APPARATUS FOR USE IN TRANSPORTING ROLLS OF CARPET OR THE LIKE

This invention relates to improvements in apparatus for use in transporting rolls of carpet or the like.

Carpet rolls are quite long and heavy, requiring considerable manpower to load them onto a truck or trailer at a storage facility for transport to the job site and to unload them at the job site in order that the carpet may be cut to size and installed at the job site. Also, of course, due to their bulk, the rolls are difficult to handle as they are unrolled for sizing purposes.

U.S. Pat. No. 3,750,811 shows an open framework having means by which a roll of carpet may be raised and lowered with respect to a support surface by means of cables or lines controlled by a winch mounted on the framework and attachable to the free ends of a rod inserted through the roll. The framework is supported by casters which permit it to be moved into a position behind the open end of a bed of a truck, and, in the latter position, one of the winch lines may be looped about a carpet roll on the bed of the truck to assist in pulling the roll off of the bed and onto the ground surface at the rear end of the truck. At this time, the rod may be inserted through the roll to permit it to be lifted from the support surface, as previously described, and thus transported by the framework to the desired location. Still further, a device is provided for attachment to the framework in such a manner as to facilitate cutting of the carpet as the roll supported by the framework is unwound. However, there is no apparent way in which the winch-controlled lines may be used to pull the roll onto the bed of the truck, much less a means by which the roll may be lifted to a position within the vehicle which facilitates cutting it to size without removing it from the truck and then returning it thereto.

U.S. Pat. No. 3,971,484 shows a trailer having a winch-controlled line so arranged therein as to facilitate pulling the carpet through the open rear end of a trailer and onto the bed of the trailer as well as pulling it out of the trailer and onto a support surface to the rear of the trailer. However, considerable manpower would appear to be required for this purpose, and, as in the case of the framework of U.S. Pat. No. 3,750,811, there is no apparent way in which the winch-controlled line may be used to lift it to a position within the vehicle which facilitates cutting it to size without removal from the trailer.

An object of this invention is to provide apparatus including a vehicle, such as a truck or trailer, for transporting the roll to and from the job site and which is so equipped that the roll may be pulled onto or from the bed thereof with a minimum of time and manpower, and, more particularly, which permits the roll to be raised to or lowered from a supported position above the bed of the vehicle and thus to be cut or otherwise handled without removal from the vehicle.

Another object is to provide apparatus which includes winches which are so constructed as to permit the carpet to be unrolled and cut at a convenient location outside of the vehicle, but without having to remove the roll itself from the vehicle.

Still another object is to provide such apparatus in which only one workman is required to pull the carpet onto or from the bed of the vehicle, to raise or lower it from the bed of the vehicle, and further to unroll the carpet from the supported roll so that it may be cut at a location outside of the vehicle.

These and other objects are accomplished, in accordance with the illustrated embodiment of the invention, by apparatus which comprises a spindle adapted to be inserted lengthwise through the roll, a vehicle having an opening in its rearward end through which the roll may be passed lengthwise into and out of the vehicle, and forward and rearward brackets for receiving the free ends of the spindle so as to support the roll longitudinally above the vehicle floor. More particularly, winches are mounted near the rearward and forward ends of the vehicle, and the line of each winch is releasably attachable to an end of the spindle, so that with the roll arranged to the rear and lengthwise of the vehicle, the forward winch line may be connected to the forward end of the spindle and taken up in order to raise the forward end of the roll above the level of the vehicle floor and, when the forward end of the roll is so raised, the forward winch line may be connected to the forward end of the spindle and taken up in order to pull the roll lengthwise onto the vehicle floor generally beneath the bracket means. Then, upon disconnection of the rearward winch line from the foward end of the spindle, the forward and rearward winch lines may be connected to the forward and rearward ends of the spindle, respectively, and taken up in order to lift the roll above the vehicle floor to a level at which the ends of the spindle may be received on the brackets.

In the preferred and illustrated form of the invention, the vehicle also has an opening in one side through which the roll may be drawn as it is unwound from the spindle. More particularly, the vehicle includes a closure for the opening which may be supported in a generally horizontal position to provide a work surface on which the unwound roll may be cut outside of the vehicle and adjacent the opening.

Each bracket includes a hook in which one end of the spindle may be received, and one end of the spindle has stop means thereon which is engageable with the hook in which it is received so as to limit endwise movement of the spindle when the roll is in supported position. Preferably, the stop means is on the rearward end of the spindle, and the apparatus also includes a plate having a hole to permit it to be moved over the forward end of the spindle into a position in which it engages the stop means, the outer diameter of the plate approximating that of the roll before unwinding so as to prevent the convolutions of the roll from sliding lengthwise of the spindle as the roll is lifted onto the vehicle floor.

An idler pulley is so mounted on the vehicle that the forward winch line may be extended over it in order to suspend the forward end of the spindle rearwardly beneath the pulley as the roll is raised and lowered onto the brackets, and thus minimize endwise movement of the roll as it is raised or lowered.

The winch lines are also useful in handling two or more rolls of carpet which may be stored within the vehicle beneath the level of the supported roll. That is, the supported roll may be lowered onto the vehicle floor, the winch lines removed from the opposite ends of the spindle thereof, and the spindle removed from just-lowered roll and inserted onto another roll on the vehicle floor, so that the winch lines may be reconnected to the ends of the spindle in order to raise the other roll into supported position on the brackets within the vehicle.

A longitudinally extending beam is mounted on the ceiling of the vehicle and arms are mounted on and depend from the beam to support the hooks in which the ends of the spindle are received. More particularly, the winches are mounted on the beam at positions in front of and behind the arms for the front and rear hooks so that, with the rear winch line extended over the aforementioned idler pulley, both winch lines will extend essentially vertically to connection with the free ends of the spindle.

Preferably, the stop means at one end of the spindle comprises collars about that end inwardly of the means to which a winch line may be connected, the collars being longitudinally spaced apart in order to permit them to be disposed on opposite sides of the bracket in which one end is received. When in place about the spindle, the aforementioned plate moves into engagement with the inner stop collar.

In the drawings, wherein like reference characters are used throughout to designate like parts:

FIG. 2 is a longitudinal sectional view of the vehicle showing the free ends of the spindle inserted through a roll of carpet supported by the brackets suspended from the ceiling of the vehicle;

Figure 1:
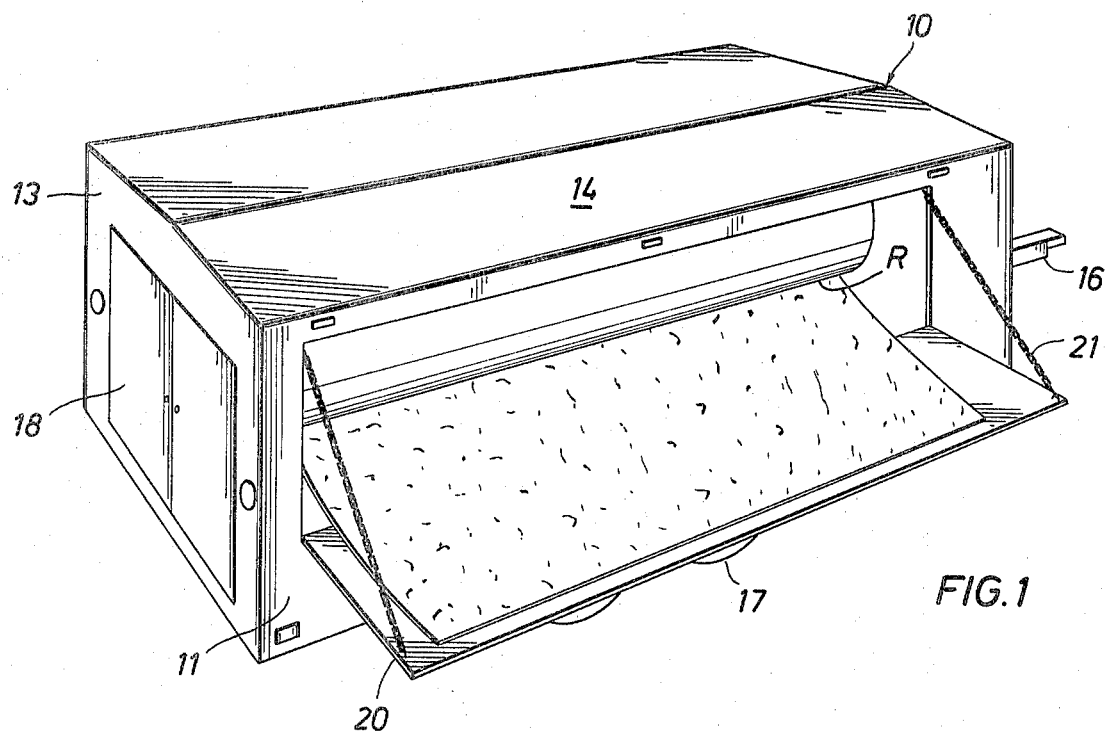
FIG. 1 is a perspective view, as seen from the top, side and rearward end of a trailer constructed in accordance with the present invention, and with the closure for its side opening swung downwardly to a position for supporting the carpet as it is unwound from the roll supported with the vehicle.

As shown in the drawings, the trailer 10 may be closed on both sides 11 as well as on its front and rear ends 13, and has a ceiling 14 above its floor 15 so that it is enclosed in an essentially waterproof manner. The front end of the trailer has a hitch 16 of conventional construction for attachment to a towing truck, and tires 17 are mounted on the hubs of axles extending laterally beneath the trailer to permit it to be towed in the desired direction. Alternatively, the vehicle may instead be a truck having an enclosed body, and the term "vehicle" as used herein contemplates either a towed or a self-propelled vehicle.

An opening in the rear end 13 of the trailer is adapted to be closed by doors 18 which, when swung to open position, enable a roll R of carpet to be moved into or out of the trailer. The trailer is of course of such length that when the carpet is disposed longitudinally therein, the doors 18 may be closed. Preferably, there is also an opening in the front end 12 of the trailer which is closed by a door 19, this opening facilitating access to the front end of the interior of the trailer.

One side 11 of the trailer also has an opening therein which may be closed by a door 20 hingedly connected to the lower edge of the opening. For reasons which will be apparent from the description to follow, the opening extends substantially the full length of the trailer, and in any event for a length greater than the roll R of carpet, and, when opened, is supported in a horizontal position by means of chains 21 connecting its opposite ends to the side of the trailer. This as well as the front and rear doors may be locked in closed positions in any suitable manner.

Figure 3:
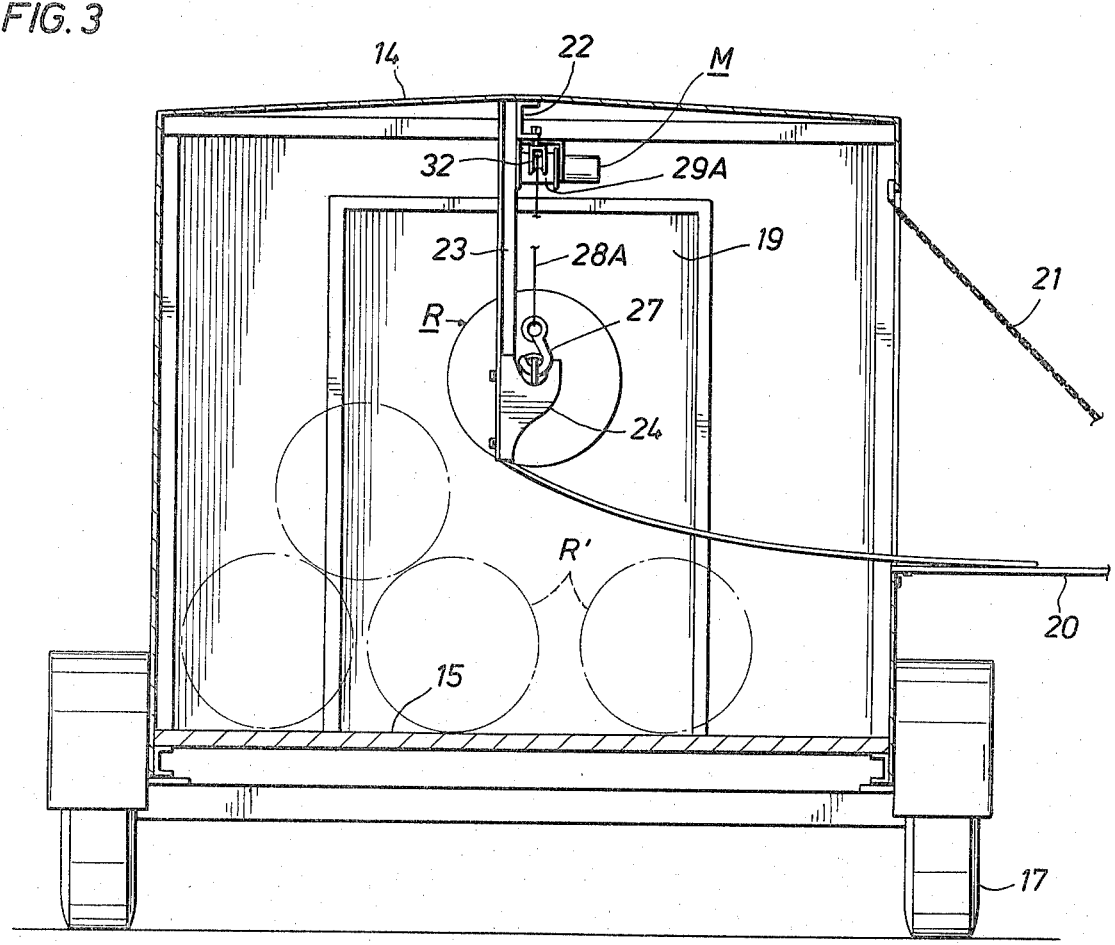
FIG. 3 is a cross-sectional view of the trailer, as seen along broken lines 3—3 of FIG. 2.

A beam 22 is secured to the ceiling of the trailer to extend lengthwise thereof generally intermediate its opposite sides. Arms 23 are connected to and extend downwardly from the beam near its forward and rearward ends and in general alignment longitudinally of the trailer. More particularly, the arms are so spaced apart as to receive a roll R therebetween, as best shown in FIG. 3, and a bracket in the form of a hook 24 is suspended from the lower end of each arm to provide upwardly facing recesses or cradles in which the outer ends of a spindle 25 inserted through the roll R may be received so as to support the roll at a level above the floor 15 of the trailer. As shown in FIGS. 2 and 3, additional rolls R′ may be stored on the trailer floor 15 beneath as well as to one side of the supported roll R.

As shown, eyes 26 are mounted on the outermost ends of the spindle to receive hooks 27 on the lower ends of lines 28A and 28B from forward and rearward winches 29A and 29B, respectively, in order to permit the roll to be raised into and lowered from its supported position, as will be described to follow.

Figure 4:
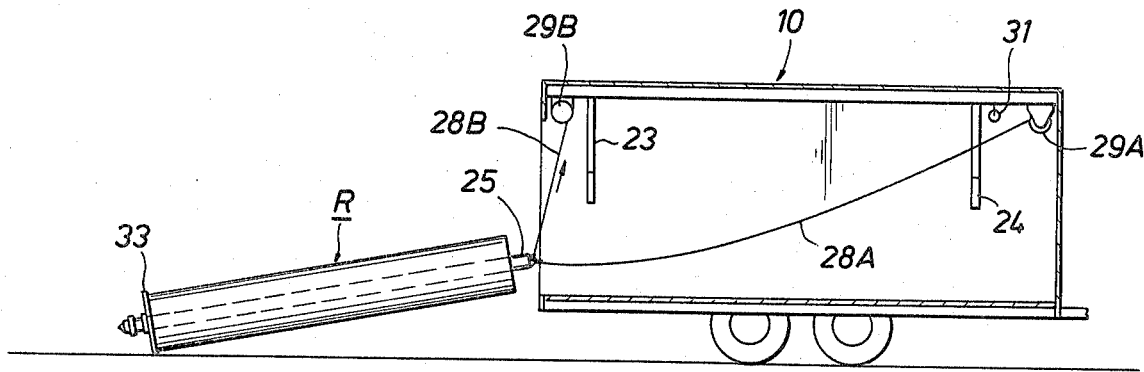
FIGS. 4, 5 and 6 are longitudinal sectional views of the trailer on a reduced scale, and illustrating successive stages of manipulation of the winch lines during pulling of a roll of carpet onto the bed of the trailer.
Figure 5:
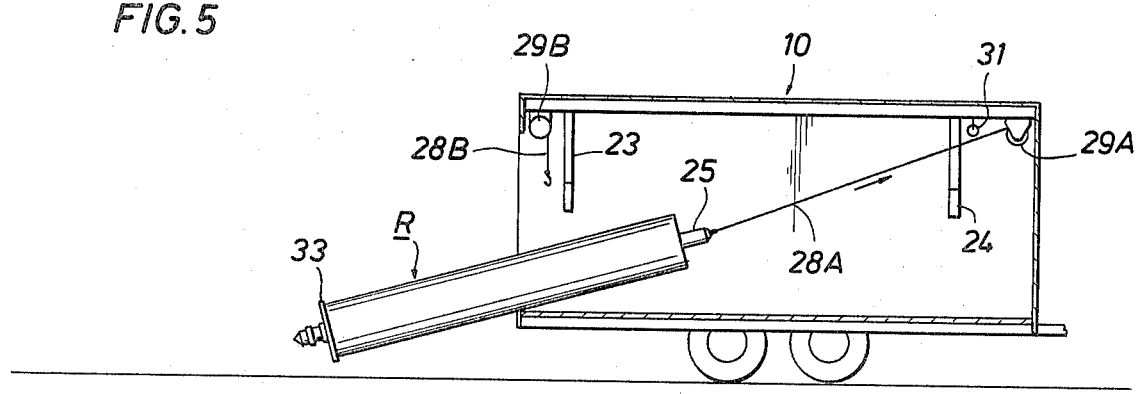

As best shown in FIG. 2, the rearward end of the spindle 25 has a pair of spaced-apart collars 32 which, when the spindle is supported by brackets 24, are disposed on opposite sides of the rear hook 24 so as to limit endwise movement of the spindle out of supported position. The forwardmost collar 32 provides a stop against which a disc or plate 33 engages as the plate is moved over the forward end of the spindle supported through the roll R. Thus, as shown in FIG. 2, the plate has a central hole to receive the spindle, and the outer diameter of the plate is at least as large as the diameter of the unwound roll R so that, when the forward end of the roll is tilted upwardly, as shown in FIGS. 4 and 5, for example, the plate prevents the convolutions of the roll from sliding lengthwise of the roll relatively with respect to one another. As will be understood, the plate may remain in place as the spindle is moved from within one roll and inserted through another.

A forward winch 29A is supported from a forward bracket 30A connected to the forward end of the beam 22 and a rearward winch 29B is suspended from a rearward bracket 30B connected to the rearward end of the beam. As indicated in FIG. 3, each winch is driven by a reversible electric motor which derives its energy from a battery B mounted on the floor of the trailer, as shown in FIG. 2.

An idler pulley 31 is connected to the beam 22 to the rear of forward winch 29A and generally above the forward end of the supported spindle 25, as best shown in FIG. 2. As also best shown in FIG. 2, winch 29B is located generally above the rearward end of the supported spindle, so that the end of winch line 28B also extends vertically to connection with the rearward end of the spindle. Thus, during raising and lowering of the rearward end of the spindle, by simultaneous take-up or let-out of the winch lines, the spindle and roll will be maintained substantially horizontal. Switches S are mounted on the wall of the trailer near its rearward end for selectively controlling take-up or let-out of the winch lines.

As will best be understood from FIG. 3, in lifting a roll onto supported position, the winch lines are taken up to raise the ends of the spindle above the bracket recesses and then let out to seat them in the recesses. This requires that the ends of the spindle slide upwardly along the lower sides of the brackets, and the spindle then swung into a position above the brackets, following which the winch lines need only be let out enough to lower the ends of the spindles into the recesses. In order to lower the roll from its supported position, the winch lines need only be taken up enough to raise the ends of the spindle above the bracket recesses, and then swung outwardly, or to the right in FIG. 3, following which the winch lines may be let out to lower the ends of the spindles downwardly past the brackets. As previously described, when the roll has been lowered onto the vehicle floor, or onto other stored rolls, the hooks 27 may be removed from the eyes to permit the spindle to be withdrawn from the lowered roll and then passed through another roll preparatory to lifting it by the winches into supported position.

When the roll R is in its supported position, closure 20 may be lowered to its generally horizontal position, as shown in FIGS. 1 and 3, so as to permit the free end of the carpet roller to be drawn through the side opening in the trailer and onto the work surface provided by the upper side of the closure. With the carpet so supported, workmen may cut it to size, whereupon the cut portion of the carpet may be carried to the point of installation, and the carpet further unwound from the roll onto the work surface preparatory to making a subsequent cut. During transport, of course, the free end of the carpet is withdrawn within the trailer, and the closure 20 moved to closed position.

Figure 6:
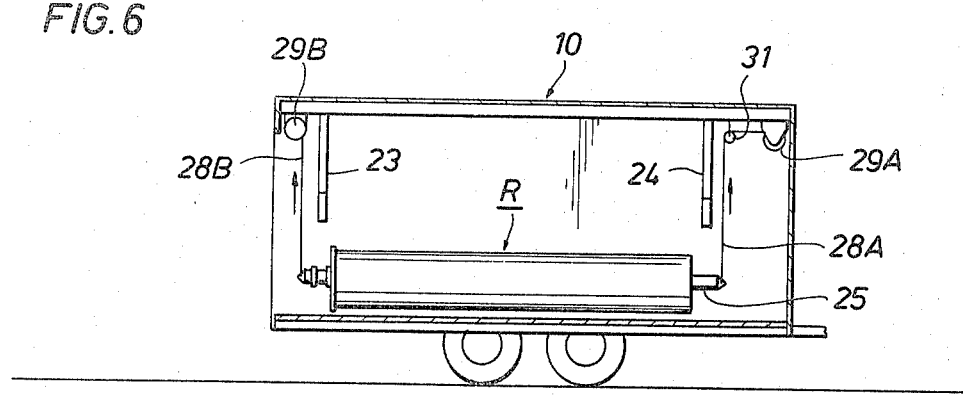

As illustrated in FIGS. 4 to 6, in order to lift a roll of carpet which is extended lengthwise behind the trailer, the rearward winch line 28B is connected to the forward end of the spindle, and then taken up, as indicated by the arrow in FIG. 4, in order to lift the forward end of the spindle to a level above the floor of the trailer. As also shown in FIG. 4, the forward winch line 28A is also connected to the forward end of the spindle, so that with the forward end of the spindle supported by the rearward winch line, the forward winch line may be taken up to drag the spindle forwardly into the trailer, as shown in FIG. 5. At this time, the rearward winch line 29A may be disconnected from the forward end of the spindle to permit the roll to be drug further onto the floor of the trailer. The forward winch line is guided over the pulley, and the rearward winch line is reconnected to the rearward end of the spindle, whereby both lines may be taken up, as indicated by the arrows in FIG. 6 in order to raise the spindle and the carpet thereon onto supported position on the hooks, as previously described.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in transporting rolls of carpet or the like, comprising a spindle adapted to be inserted lengthwise through the roll, a vehicle having an opening in its rearward end through which the roll may be passed lengthwise into and out of the vehicle, forward and rearward brackets for receiving the free ends of the spindle so as to support the roll longitudinally above the vehicle floor, and winches mounted near the forward and rearward ends of the vehicle, each having a line releasably attachable to an end of the spindle, so that with the roll arranged to the rear and lengthwise of the vehicle, the rearward winch line may be connected to the forward end of the spindle and taken up in order to raise the forward end of the roll above the level of the vehicle floor and, when the forward end of the roll is so raised, the forward winch line may be connected to the forward end of the spindle and taken up in order to pull the roll lengthwise onto the vehicle floor generally beneath the bracket means, whereby, upon disconnection of the rearward winch line from the forward end of the spindle, the forward and rearward winch lines may be connected to the forward and rearward ends of the spindle, respectively, and taken up in order to lift the roll above the vehicle floor to a level at which the ends of the spindle may be received on the brackets.

2. Apparatus of the character defined in claim 1, wherein the vehicle has an opening in one side through which the roll may be drawn as it is unwound from the spindle.

3. Apparatus of the character defined in claim 2, wherein the vehicle includes a closure for the opening which may be supported in a generally horizontal position to provide a work surface for the unwound roll outside of the vehicle and adjacent the opening.

4. Apparatus of the character defined in claim 1, wherein each bracket includes a hook in which an end of the spindle may be received, and one end of the spindle has stop means thereon engageable with the hook in which it is received to limit endwise movement of the spindle.

5. Apparatus of the character defined in claim 4, wherein the stop means is on the rearward end of the spindle, and the apparatus further includes a plate having a hole to permit it to be moved over the forward end of the spindle and to a position in which it engages the stop means, and an outer diameter approximating that of the roll before unwinding so as to prevent the convolutions of the roll from sliding lengthwise of the spindle as the roll is lifted onto the vehicle floor.

6. Apparatus of the character defined in claim 1, including an idler pulley over which the forward winch line may be extended in order to suspend the forward end of the spindle generally beneath the pulley as the roll is raised onto and lowered from the brackets.

7. Apparatus of the character defined in claim 1, wherein the interior of the vehicle beneath the level of the supported roll is free to store additional rolls.

8. Apparatus of the character defined in claim 1, wherein the vehicle includes a longitudinally extending beam mounted on the vehicle ceiling, and arms mounted on and depending from the beam to support the hooks.

9. Apparatus of the character defined in claim 8, wherein the winches are mounted on the beam in front of and behind the arms for the front and rear hooks to connect with the outermost ends of the spindle.

* * * * *